US012077989B2

(12) United States Patent
Niegmann et al.

(10) Patent No.: US 12,077,989 B2
(45) Date of Patent: Sep. 3, 2024

(54) ARRANGEMENT FOR ELECTRONIC LOCKING SYSTEM, AND ELECTRONIC LOCKING SYSTEM

(71) Applicant: ASSA ABLOY AB, Stockholm (SE)

(72) Inventors: Kaj Niegmann, Åkersberga (SE); Daniel Skarp, Enebyberg (SE)

(73) Assignee: ASSA ABLOY AB, Stockholm (SE)

( * ) Notice: Subject to any disclaimer, the term of this patent is extended or adjusted under 35 U.S.C. 154(b) by 291 days.

(21) Appl. No.: 17/620,072

(22) PCT Filed: May 25, 2020

(86) PCT No.: PCT/EP2020/064414

§ 371 (c)(1),
(2) Date: Dec. 16, 2021

(87) PCT Pub. No.: WO2020/259935

PCT Pub. Date: Dec. 30, 2020

(65) Prior Publication Data

US 2022/0316239 A1 Oct. 6, 2022

(30) Foreign Application Priority Data

Jun. 27, 2019 (SE) .................................. 1950801-9

(51) Int. Cl.

*E05B 39/00* (2006.01)
*E05B 47/00* (2006.01)
*G07C 9/00* (2020.01)

(52) U.S. Cl.

CPC ........ *E05B 39/007* (2013.01); *E05B 47/0012* (2013.01); *G07C 9/00944* (2013.01);
(Continued)

(58) Field of Classification Search

CPC ............... E05B 39/007; E05B 47/0012; E05B 2047/0014; E05B 2047/0017;
(Continued)

(56) References Cited

U.S. PATENT DOCUMENTS 3,733,861 A * 5/1973 Lester ................ G07C 9/00944 70/277
5,265,452 A * 11/1993 Dawson .............. E05B 47/0688 70/277
(Continued)

FOREIGN PATENT DOCUMENTS

CN 204850763 12/2015
DE 102004052802 4/2006
(Continued)

OTHER PUBLICATIONS

Official Action with English Translation for China Patent Application No. 202080045896.9, dated May 26, 2022, 21 pages.
(Continued)

*Primary Examiner* — Christopher J Boswell
(74) *Attorney, Agent, or Firm* — Schwegman Lundberg & Woessner, P.A.

(57) ABSTRACT

An arrangement (10) for an electronic locking system (24), the arrangement (10) comprising an actuating element (12) arranged to perform an actuating procedure (18) by means of manual manipulation by a user; an electromagnetic generator (14) comprising a stator (20) and a rotor (22), the rotor (22) being arranged to be rotationally driven relative to the stator (20) at least temporarily during the actuating procedure (18) by movement of the actuating element (12) to thereby generate electric energy; and an electronic control system (16) arranged to be electrically powered by the generator (14); wherein the control system (16) is arranged to control a provision of feedback to the user; and wherein the feedback is a haptic feedback in the actuating element
(Continued)

(12), a sound signal, a light signal, or combinations thereof. An electronic locking system (24) comprising the arrangement (10) is also provided.

13 Claims, 4 Drawing Sheets

(52) U.S. Cl.
CPC ................. *E05B 2047/0017* (2013.01); *E05B 2047/0053* (2013.01); *E05B 2047/0062* (2013.01); *G07C 2009/00634* (2013.01)

(58) Field of Classification Search
CPC ..... E05B 2047/0053; E05B 2047/0057; E05B 2047/0058; E05B 2047/0062; E05B 2047/0065; E05B 2047/0097; G07C 2009/00634; G07C 2009/00944; G07C 2209/62; G07C 9/00944
See application file for complete search history.

(56) References Cited

U.S. PATENT DOCUMENTS

| | | | | |
|---|---|---|---|---|
| 5,816,084 | A | 10/1998 | Clark | |
| 6,076,383 | A | 6/2000 | Clark et al. | |
| 7,145,436 | B2 * | 12/2006 | Ichikawa | E05B 81/84 70/264 |
| 8,228,030 | B2 * | 7/2012 | Pukari | E05B 47/063 70/278.2 |
| 8,581,690 | B2 * | 11/2013 | Lappalainen | E05B 47/0611 340/5.31 |
| 8,866,439 | B2 * | 10/2014 | Pukari | E05B 47/063 70/278.2 |
| 8,981,899 | B2 * | 3/2015 | Pukari | E05B 47/063 340/5.1 |
| 10,745,935 | B2 * | 8/2020 | Coster | E05B 7/00 |
| 2004/0035160 | A1 | 2/2004 | Meekma et al. | |
| 2007/0176491 | A1 | 8/2007 | Kang et al. | |
| 2010/0180649 | A1 | 7/2010 | Harvey | |
| 2013/0000366 | A1 | 1/2013 | Martel et al. | |
| 2014/0165678 | A1 | 6/2014 | Burrus et al. | |
| 2015/0259949 | A1 | 9/2015 | Cheng | |
| 2017/0002586 | A1 | 1/2017 | Lee | |
| 2018/0328075 | A1 | 11/2018 | Coster et al. | |
| 2019/0068085 | A1 | 2/2019 | Webb et al. | |
| 2021/0079690 | A1 * | 3/2021 | Von Matern | E05B 47/0603 |
| 2022/0106813 | A1 * | 4/2022 | Von Matern | E05B 47/0001 |

FOREIGN PATENT DOCUMENTS

| | | |
|---|---|---|
| DE | 102014105432 | 10/2015 |
| EP | 0361881 | 4/1990 |
| EP | 1808816 | 7/2007 |
| EP | 2960408 | 12/2015 |
| EP | 3318703 | 5/2018 |
| EP | 3480395 | 5/2019 |
| WO | WO 2015/054667 | 4/2015 |
| WO | WO 2018/222817 | 12/2018 |

OTHER PUBLICATIONS

Official Action for Sweden Patent Application No. 1950801-9, dated Feb. 28, 2020, 8 pages.
Official Action for Sweden Patent Application No. 1950801-9, dated Aug. 17, 2021, 33 pages.
International Search Report and Written Opinion for International (PCT) Patent Application No. PCT/EP2020/064414, dated Sep. 1, 2020, 13 pages.
Second Written Opinion for International (PCT) Patent Application No. PCT/EP2020/064414, dated Jan. 20, 2021, 7 pages.
International Preliminary Report on Patentability for International (PCT) Patent Application No. PCT/EP2020/064414, dated Oct. 12, 2021, 40 pages.
Official Action with English Translation for China Patent Application No. 202080045896.9, dated Sep. 8, 2022, 7 pages.
Intention to Grant for European Patent Application No. 20728470.4, dated Jan. 30, 2023, 35 pages.

* cited by examiner

ARRANGEMENT FOR ELECTRONIC LOCKING SYSTEM, AND ELECTRONIC LOCKING SYSTEM

CROSS REFERENCE TO RELATED APPLICATIONS

This application is a national stage application under 35 U.S.C. 371 and claims the benefit of PCT Application No. PCT/EP2020/064414 having an international filing date of May 25, 2020, which designated the United States, which PCT application claimed the benefit of Sweden Patent Application No. 1950801-9 filed Jun. 27, 2019, the disclosure of each of which are incorporated herein by reference.

TECHNICAL FIELD

The present disclosure generally relates to an arrangement for an electronic locking system. In particular, an arrangement comprising an actuating element, an electromagnetic generator and an electronic control system, and an electronic locking system comprising the arrangement, are provided.

BACKGROUND

Various types of electronic locking systems are known in the art. Instead of utilising a purely mechanical lock, some locking systems include an electronic drive of a lock member (e.g. a lock bolt) to unlock a door, or other access member, to give physical access to the area behind the door.

Furthermore, instead of utilizing a traditional key to unlock the door, various types of electronic communication methods for authorizing a person to access the area behind the door are known. Such communication methods can be based on wireless communication, e.g. Radio Frequency Identification (RFID) or Bluetooth Low Energy (BLE). Contact based communication is also possible, for example where an electronic key is inserted into the lock to enable communication.

In order to power an electronic locking system, so called “self-powered” electronic locking systems have been proposed, where electric energy is generated based on an actuating movement by of the user (e.g. of a door handle, key insertion or door opening) and the generated electric energy is used to power the electronic locking system. This concept is also known as energy harvesting.

Some electronic locking systems comprise a cylinder housing, a lock member rotatably arranged in the cylinder housing, a rotatable knob and an actuator for selectively coupling the knob with the lock member. When a user has been electronically authorized, the actuator couples the knob and the lock member and the lock can be opened by turning the knob.

DE 102014105432 A1 discloses an electromechanical lock cylinder comprising a cylinder housing, a knob, a lock control and an electromotor working as a generator.

SUMMARY

A vibration motor may be provided in a knob of an electronic locking system in order to provide haptic feedback to the user. The haptic feedback may for example be provided in dependence of an outcome of an authorization request and/or in dependence of a pairing event with an external device. By means of the vibration motor, the knob can vibrate to indicate various events, such as when an authorization request is accepted. The vibration motor may for example comprise an eccentric rotating mass that vibrates when rotated. Power is however needed in order to drive rotation of the mass.

When an electronic locking system comprises a battery for powering the vibration motor, the battery may need to be replaced regularly which is troublesome. Furthermore, the additional components of a vibration motor and a battery for powering the vibration motor add complexity, space and costs to the electronic locking system.

One object of the present disclosure is to provide an arrangement for an electronic locking system, which arrangement has a simple design.

A further object of the present disclosure is to provide an arrangement for an electronic locking system, which arrangement has a cost-effective design.

A still further object of the present disclosure is to provide an arrangement for an electronic locking system, which arrangement has a compact design.

A still further object of the present disclosure is to provide an arrangement for an electronic locking system, which arrangement has an energy efficient design.

A still further object of the present disclosure is to provide an arrangement for an electronic locking system, which arrangement has a reliable design.

A still further object of the present disclosure is to provide an arrangement for an electronic locking system, which arrangement improves user experience, e.g. by avoiding the need to replace a battery.

A still further object of the present disclosure is to provide an arrangement for an electronic locking system, which arrangement solves several or all of the foregoing objects in combination.

A still further object of the present disclosure is to provide an electronic locking system solving one, several or all of the foregoing objects.

According to one aspect, there is provided an arrangement for an electronic locking system, the arrangement comprising an actuating element arranged to perform an actuating procedure by means of manual manipulation by a user; an electromagnetic generator comprising a stator and a rotor, the rotor being arranged to be rotationally driven relative to the stator at least temporarily during the actuating procedure by movement of the actuating element to thereby generate electric energy; and an electronic control system arranged to be electrically powered by the generator; wherein the control system is arranged to control a provision of feedback to the user; and wherein the feedback is a haptic feedback in the actuating element, a sound signal, a light signal, or combinations thereof.

Since the control system is electrically powered by the generator and since the control system is arranged to control the provision of feedback to the user, the arrangement does not need any battery for powering a dedicated vibration motor, a loudspeaker or a light emitting element. The arrangement may thus further comprise a loudspeaker for issuing the sound signal and/or a light emitting element for issuing the light signal. The light emitting element may be arranged in the actuating element.

Various types of feedback patterns are possible. The feedback may for example be provided after a certain amount of electric energy has been harvested by the actuating procedure of the actuating element.

The control system may comprise power management electronics and a microcontroller. In this case, the power management electronics may be arranged to be electrically powered by the generator, the microcontroller may be electrically powered by the power management electronics and the microcontroller may be arranged to control a provision of feedback to the user.

The actuating element may be movable relative to a base structure. In this case, the stator is fixed with respect to the base structure. The base structure may for example be an access member, such as a door. The actuating element may be manually grabbed and moved by the hand of a user to perform the actuating procedure.

The generator can convert mechanical energy from movements of the actuating element to electric energy. Electric energy harvested by manually moving the actuating element can thereby be used to electrically power the control system. In addition to controlling the generator, the control system can carry out an authorization process.

Since the control system is arranged to be electrically powered by the generator, and the actuating element is arranged to drive the rotor of the generator, the arrangement is an energy harvesting arrangement. The generator may function as a primary energy source for the control system.

The control system may be arranged in proximity to the generator. Alternatively, since the control system is electrically powered by the generator, the control system can be spatially separated from the generator.

The control system may be provided as a single unit or may be provided in several, and possibly spatially separated, units.

The actuating element may be permanently coupled to the rotor. In this case, the rotor always rotates when the actuating element is moved. A transmission may be provided between the actuating element and the rotor. The transmission may be arranged to transmit the movement of the actuating element to a rotation of the rotor. For example, in case the actuating procedure comprises a rotational movement of the actuating element, the actuating element and the rotor may rotate with different speeds. The transmission may be a gear transmission comprising one or more intermediate gear steps, such as pairs of gear wheels.

The actuating procedure may comprise an energy harvesting movement, and a feedback phase initiated after initiation of the energy harvesting movement, wherein electric energy is generated by the generator when the actuating element is manipulated to perform the energy harvesting movement, and wherein haptic feedback is provided in the actuating element when the actuating element moves in the feedback phase. During the energy harvesting movement, the actuating element may have a substantially constant, or constant, mechanical resistance for a constant actuation speed of the actuating element. The mechanical resistance in the actuating element during the energy harvesting movement may depend on a gear ratio between the actuating element and the rotor, actuation speed of the actuating element and electric energy output from the generator etc. The electric energy output from the generator may be controlled by the control system. In some implementations, the actuating element feels relatively heavy when being moved to harvest electric energy.

The haptic feedback provided in the actuating element during movement of the actuating element in the feedback phase may be different from the "feeling" during the energy harvesting movement of the actuating element. For example, the haptic feedback may be lighter, heavier, or otherwise different, than the mechanical resistance in the actuating element during the energy harvesting movement. Alternatively, or in addition, the haptic feedback may be pulsed.

During the energy harvesting movement of the actuating element, the actuating arrangement may be said to adopt an energy harvesting state mainly intended for harvesting electric energy by means of movement of the actuating element. The feedback phase may be referred to as a feedback state of the arrangement where haptic feedback is at least temporarily provided in the actuating element when the actuating element moves. Electric energy may however also be harvested in the feedback phase or feedback state.

The control system may be arranged to control a load of the generator to change in order to provide haptic feedback in the actuating element at least temporarily during the actuating procedure. The generator thereby fulfills two purposes, to generate electric energy by the movement of the actuating element, and to provide haptic feedback to the user. Thus, the need for a dedicated vibration motor and a battery for powering such vibration motor, can be eliminated. The arrangement thereby uses a relatively small amount of the electric energy, harvested by movement of the actuating element, to create haptic feedback.

In some implementations, the use of haptic feedback is preferred over a visual feedback, e.g. from a light emitting element. For example, in case a light emitting element is provided in a knob to provide visual feedback, the user may not see the visual feedback when holding the knob. The haptic feedback according to the present disclosure may also be preferred over an audible feedback due to the relatively high costs and electric energy consumption associated with loudspeakers. The provision of haptic feedback in the actuating element by electric energy harvested by movement of the actuating element according to the present disclosure reduces the bill of materials (BOM) and design complexity of the arrangement. Furthermore, the user will feel the feedback in the actuating element and does not have to look for a light signal or listen for a sound signal.

The control system may be arranged to control the load of the generator to change in pulses in order to provide a pulsed mechanical response in the actuating element. By controlling the load of the generator to change in pulses in this way, vibration feedback can be "simulated" in the actuating element as a user moves the actuating element, without using a vibration motor. By means of the energy harvesting, the user provides the electric energy required for the haptic feedback. The pulsing may be provided by means of pulse-width modulated (PWM) control.

A first type of pulses may be provided upon a first type of event in the electronic locking system, and a second type of pulses may be provided upon a second type of event in the electronic locking system. The first and second types of pulsing thereby constitute a first and second feedback pattern. The first type of pulses may comprise a different number of pulses, different lengths of pulses, and/or pulses of different force than the second type of pulses.

The control system may be arranged to control the load of the generator to change by changing an electric load of the generator. For example, the control system may be arranged to control an electric resistance of the generator to change in order to provide haptic feedback in the actuating element. By decreasing the electric resistance, the actuating element feels heavier to move. By increasing the electric resistance, the actuating element feels lighter to move.

To this end, the arrangement may comprise a disconnection switch for selectively disconnecting the generator. The disconnection switch may be provided on one of the terminals of the generator. The disconnection switch may be controlled to open and close by the control system. When the disconnection switch is closed, rotation of the rotor causes electric energy to be transferred to the control system. When the disconnection switch is open, the generator is disconnected (i.e. an electric circuit comprising the generator is opened), the electric resistance becomes high, and the actuating element feels light to move.

Alternatively, or in addition, the arrangement may comprise a shorting switch for selectively shorting the generator. The generator may be short-circuited directly or via an electric resistor. The shorting switch and the electric resistor may be provided between two terminals of the generator. The electric resistor may have relatively low electric resistance. Alternatively, the electric resistor may have a variable electric resistance. The shorting switch may be controlled to open and close by the control system. When the shorting switch is open, rotation of the rotor causes electric energy to be transferred to the control system. When the shorting switch is closed, the harvested electric energy is converted to heat in the electric resistor and the actuating element feels heavy to move. Further ways to change the electric load of the generator are possible.

The control system may be arranged to provide the feedback to the user when an amount of electric energy generated by the generator exceeds an energy threshold. Thus, the feedback may be used to confirm that enough electric energy has been harvested by the actuating procedure of the actuating element by the user. The energy threshold may for example be a voltage threshold in an electric energy storage device. Alternatively, or in addition, the control system may be arranged to provide the feedback to the user after a certain time.

The control system may be arranged to provide the feedback to the user upon denied access of the electronic locking system. Alternatively, or in addition, the control system may be arranged to provide the feedback to the user upon a communication failure between the control system and an external device, such as a mobile phone or portable key device. The communication failure may for example be a failed pairing or a failure when reading data, e.g. by means of RFID or BLE.

Alternatively, or in addition, feedback may be provided to indicate a successful pairing between the control system and the external device, such as a mobile phone. Alternatively, or in addition, the feedback may be provided to indicate an error state in the electronic locking system.

Alternatively, or in addition, the feedback may be provided to indicate whether an authorization request is granted and/or denied.

The actuating procedure may comprise a rotation of the actuating element. The actuating element may be arranged to be rotated continuously and/or in either direction. Alternatively, or in addition, the actuating element may comprise a knob. Alternatively, the actuating element may comprise a lever handle or a door.

The control system may comprise an electric energy storage device arranged to be electrically charged by the generator. The electric energy storage device may be a passive non-chemical electric energy storage device, such as a capacitor or supercapacitor. Alternatively, the electric energy storage device may be a battery, for example a rechargeable battery. The control system may comprise power management electronics. In this case, the power management electronics may comprise the electric energy storage device.

According to a further aspect, there is provided an electronic locking system comprising an arrangement according to the present disclosure. The electronic locking system comprising the arrangement may be referred to as an energy harvesting electronic locking system. The electronic locking system may for example comprise a lock cylinder. In this case, the electronic locking system may be said to constitute a digital lock cylinder or an electromechanical lock cylinder.

The electronic locking system may further comprise an actuator for controlling a locking function and/or unlocking function, wherein the actuator is arranged to be electrically powered by the generator. The electric energy harvested by movement of the actuating element can be used to drive the actuator, e.g. of a mechanical lock. The actuator may be arranged to be electrically powered by the generator via the control system, e.g. via power management electronics of the control system.

The control system may be configured to produce an authorization signal, for switching the actuator from a locked state to an unlocked state, upon authorization of a user. For example, the actuator may comprise an actuator pin and an electric actuator motor arranged to drive the actuator pin between two positions such that the actuator can adopt a locked state and an unlocked state. In the locked state of the actuator, a lock member cannot be moved by movement of the actuating element. In the unlocked state of the actuator, the lock member can be moved by movement of the actuating element, for example to unlock a door. According to one example, the actuating element is decoupled from the lock member when the actuating element adopts the locked state, and the actuating element is coupled to the lock member when the actuator adopts the unlocked state.

The control system may for example comprise power management electronics, reading electronics, credential evaluation electronics, and a microcontroller. The power management electronics may be configured to manage the energy harvesting, e.g. to supply the microcontroller with power, and to supply the actuator with power. To this end, the power management electronics may comprise energy harvesting electronics, such as diodes for rectifying the voltage from the generator and an electric energy storage device. Thereby, electric energy can be harvested from movement of the actuating element.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
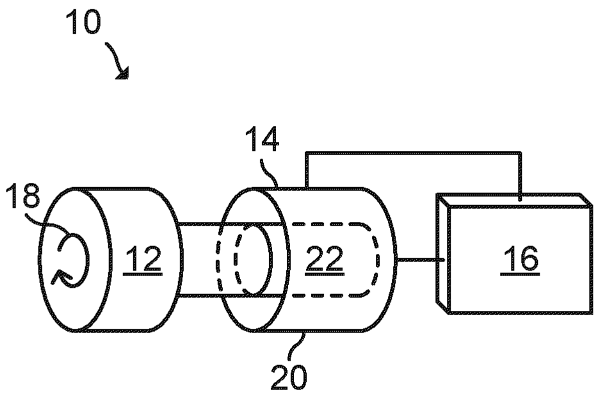
FIG. 1: schematically represents an arrangement for an electronic locking system.

In the following, an arrangement comprising an actuating element, a generator and an electronic control system, and an electronic locking system comprising the arrangement, will be described. The same or similar reference numerals will be used to denote the same or similar structural features.

FIG. 1 schematically represents an arrangement 10 for an electronic locking system. The arrangement 10 comprises an actuating element 12, an electromagnetic generator 14 and an electronic control system 16.

The actuating element 12 can be manually manipulated to carry out an actuating procedure 18. In this example, the actuating element 12 is a knob and the actuating procedure 18 comprises a rotation. The actuating element 12 can be rotated continuously or intermittently in either direction.

Alternative types of actuating element 12 for being manually moved to in an actuating procedure 18 are possible.

The generator 14 comprises a stator 20 and a rotor 22. The actuating element 12 is coupled to the rotor 22 such that the rotor 22 always rotates when the actuating element 12 rotates. The rotor 22 is thereby arranged to be rotationally driven relative to the stator 20 by rotation of the actuating element 12. When the actuating element 12 is rotated, the rotor 22 is rotated relative to the stator 20 and the generator 14 generates electric energy. In this example, a gear step (not shown) is provided between the actuating element 12 and the rotor 22. Due to the gear step, the rotor 22 rotates at a higher rotational speed than the rotational speed of the actuating element 12.

The control system 16 is arranged to be electrically powered by the generator 14. Thus, electric energy harvested by manually rotating the actuating element 12 is used to electrically power the control system 16. The control system 16 is further configured to control a provision of feedback to a user turning the actuating element 12. The generator 14 and the control system 16 are connected by means of electric conductors (not denoted), for example electric cables.

Figure 2:
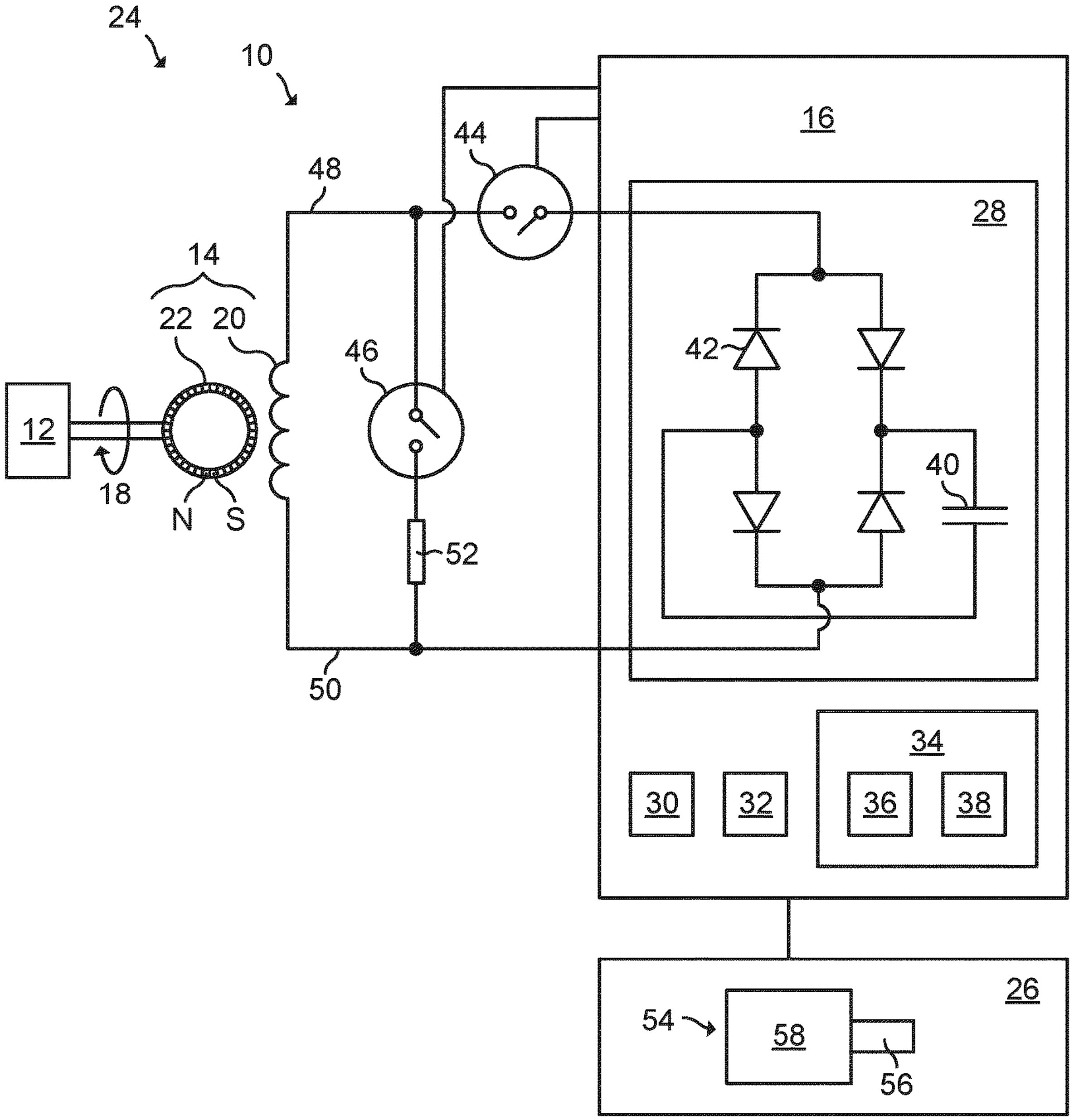
FIG. 2: schematically represents an electronic locking system comprising the arrangement and an actuator.

FIG. 2 schematically represents an electronic locking system 24 comprising the arrangement 10 in FIG. 1. In addition to the arrangement 10, the electronic locking system 24 further comprises a mechanical lock 26.

The control system 16 of this specific example comprises power management electronics 28, reading electronics 30, credential evaluation electronics 32 and a microcontroller 34. The microcontroller 34 comprises a data processing device 36 and a memory 38. A computer program is stored in the memory 38. The computer program comprises program code which, when executed by the data processing device 36 causes the data processing device 36 to perform, or command performance of, at least some of the steps as described herein.

The power management electronics 28 in FIG. 2 comprises energy harvesting electronics including an electric energy storage device, here exemplified as a capacitor 40, and four diodes 42 arranged in a diode bridge. The diodes 42 are arranged to rectify the voltage from the generator 14.

The arrangement 10 in FIG. 2 further comprises a disconnection switch 44 and a shorting switch 46. Each of the disconnection switch 44 and the shorting switch 46 is controlled by the control system 16, more specifically by the microcontroller 34. FIG. 2 further shows a positive line 48 and a ground line 50. The positive line 48 and the ground line 50 are connected to respective terminals of the generator 14. In this example, the disconnection switch 44 is provided on the positive line 48. Each of the disconnection switch 44 and the shorting switch 46 may be implemented using a transistor, such as a MOSFET (Metal Oxide Semiconductor Field Effect Transistor).

The disconnection switch 44 is arranged to selectively disconnect the generator 14. When the disconnection switch 44 is open, the electric resistance becomes high, and the actuating element 12 feels light to rotate by the user, in comparison with when rotating the actuating element 12 to harvest electric energy.

The shorting switch 46 is arranged to selectively short-circuiting the terminals of the generator 14 over an electric resistor 52. When the shorting switch 46 is closed, the harvested electric energy is converted to heat in the electric resistor 52. The actuating element 12 may then feel heavy to rotate by the user in comparison with when rotating the actuating element 12 to harvest electric energy. Thus, when the shorting switch 46 is closed, a high counter torque is provided in the generator 14, making the rotor 22 heavy to rotate by means of actuation of the actuating element 12.

By selectively controlling the disconnection switch 44 and the shorting switch 46, the control system 16 can selectively change an electric load of the generator 14 in order to provide haptic feedback to the user turning the actuating element 12. When the electric load of the generator 14 is changed, a mechanical response is generated in the actuating element 12 during the actuating procedure 18. The arrangement 10 thereby uses the generator 14 to function as an electronic brake. In case the feedback is a visual feedback, the disconnection switch 44 and the shorting switch 46 may be omitted.

As illustrated in FIG. 2, the electronic locking system 24 further comprises an actuator 54. The actuator 54 is arranged in the mechanical lock 26. The actuator 54 is arranged to control a locking function and an unlocking function of the electronic locking system 24. To this end, the actuator 54 comprises an actuator pin 56 and an electric actuator motor 58 arranged to drive the actuator pin 56 between two positions, such that the actuator 54 can adopt a locked state and an unlocked state, respectively. In the locked state of the actuator 54, a lock member (not shown) in the mechanical lock 26 cannot be moved by movement of the actuating element 12. In the unlocked state of the actuator 54, the lock member can be moved by movement of the actuating element 12, for example to unlock a door. The actuating element 12 may be coupled to the lock member when the actuator 54 adopts the unlocked state, and may be decoupled from the lock member when the actuator 54 adopts the locked state. The actuator 54 is electrically powered by the generator 14 via the control system 16, more specifically via the power management electronics 28.

The reading electronics 30 of this example comprises a receiving unit (not shown), such as an antenna, for receiving an input signal, and a reading unit (not shown). The reading electronics 30 is configured to send an access signal to the credential evaluation electronics 32. The credential evaluation electronics 32 is configured to determine whether or not authorization should be granted based on the access signal. If access is granted, e.g. if a valid credential is presented, the credential evaluation electronics 32 may issue an authorization signal.

The reading electronics 30 may be arranged to communicate wirelessly with an external device, such as a mobile phone. The wireless communication may for example be carried out by means of BLE (Bluetooth Low Energy) or RFID (Radio Frequency Identification). As an alternative to wireless communication, a user may input a code to the reading electronics 30, for example via a keypad. If an authorization request is denied, the actuator 54 is not switched, i.e. remains in the locked state.

When the actuating element 12 is manually grabbed and rotated by the hand of a user, the engagement between the actuating element 12 and the rotor 22 causes the rotor 22 to be driven to rotate. The generator 14 harvests electric energy from the rotation of the actuating element 12.

When sufficient electric energy has been harvested by the generator 14, an authorization process can be initiated (in case the control system 16 also comprises a battery, the authorization process can be initiated directly when the user actuates the actuating element 12). During the authorization process, the reading electronics 30 is powered by the power management electronics 28 and can for example pair wirelessly with an external device, such as with a mobile phone via BLE. After pairing, the reading electronics 30 receives a credential from the external device and sends an access signal, based on the credential, to the credential evaluation electronics 32.

The credential evaluation electronics 32, which is also powered by the power management electronics 28, then determines whether or not access should be granted based on the access signal. If the authorization request is denied, the actuator 54 is not switched, i.e. the actuator 54 remains in the locked state where the actuating element 12 is decoupled from the lock member. If the authorization request is granted, e.g. if a valid credential is presented, the credential evaluation electronics 32 issues an authorization signal to the actuator 54. When sufficient electric energy has been harvested by rotation of the actuating element 12, the actuator motor 58 is driven to move the actuator pin 56 such that the actuator 54 adopts the unlocked state where the actuating element 12 is coupled to the lock member.

The actuating element 12 can be continuously rotated during the authorization procedure. Electric energy harvested by manually rotating the actuating element 12 can thereby be used to authorize a user and to switch the actuator 54 from the locked state to the unlocked state. When the actuator 54 has adopted the unlocked state, the lock member of the mechanical lock 26 can be rotated by further rotation of the actuating element 12. Thus, the user can rotate the actuating element 12 continuously during the authorization process, the subsequent switching process of the actuator 54, and the subsequent rotation of the lock member. Thereby, a seamless access is provided.

Figure 3:
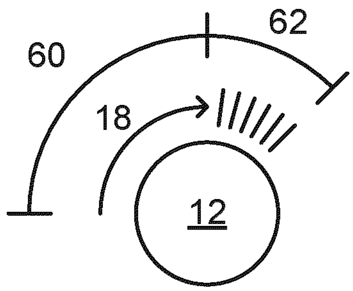
FIG. 3: schematically represents an actuating procedure of an actuating element of the arrangement.

FIG. 3 schematically represents one example of an actuating procedure 18 of the actuating element 12. In this example, the actuating procedure 18 comprises an energy harvesting movement **6*o* and a feedback phase 62. The feedback phase 62 follows the energy harvesting movement 60. However, electric energy may also be generated at least temporarily when the actuating element 12 is rotated in the feedback phase 62. The energy harvesting movement 6*o* and the feedback phase 62 may each be initiated at arbitrary angular positions of the actuating element 12**.

As the actuating element 12 is rotated to perform the energy harvesting movement 60, electric energy is harvested by the generator 14. Although the energy harvesting movement **6*o* is illustrated as a continuous rotation in one direction, the energy harvesting movement 6*o* may comprise intermittent rotations and/or rotations in both directions. The mechanical resistance in the actuating element 12 may be substantially constant, and relatively high, when the rotation speed of the actuating element 12 during the energy harvesting movement 6*o* is constant. When sufficient electric energy has been harvested, e.g. for carrying out an authorization process and for driving the actuator 54, it may be desired to indicate various events to the user turning the actuating element 14**.

One example of such event is when a sufficient amount of electric energy has been harvested by the generator 14. In some implementations, the user does then not have to turn the actuating element 12 further during the authorization process. Whether sufficient electric energy has been harvested can for example be determined based on the voltage of the capacitor 40.

A further example of such event is when the user is denied access. The user can thereby be informed that there is no reason to keep turning the actuating element 12 since the user will not be granted access.

A further example of such event is when a wireless pairing with an external device fails. The user may for example have forgotten to turn on the Bluetooth functionality in the external device to make the external device discoverable.

As shown in FIG. 3, after the energy harvesting movement **6*o* of the actuating element 12, the feedback phase 62 is initiated. When the actuating element 12 is rotated in the feedback phase 62, haptic feedback is generated in the actuating element 12 to indicate a certain event to the user. In this example, haptic feedback is provided as vibrating pulses (of higher mechanical resistance) in the actuating element 12 by PWM controlling the shorting switch 46 to intermittently close. The haptic feedback may alternatively be provided as vibrating pulses (of lower mechanical resistance) in the actuating element 12 by PWM controlling the disconnection switch 44** to intermittently open.

The microcontroller 34 is configured to control the haptic feedback in the actuating element 12. The microcontroller 34 decides when to issue the haptic feedback, and what type of haptic feedback to be issued.

According to one of many possible examples, the user rotates the actuating element 12 to perform the energy harvesting movement 60. When sufficient electric energy has been harvested, the actuating element 12 enters the feedback phase 62 and a first haptic feedback pattern is generated in the actuating element 12 when the actuating element 12 is rotated in the feedback phase 62. In response to the first haptic feedback pattern, the user stops the rotation of the actuating element 12 for a few seconds and waits for authorization to be granted.

The user then grabs and rotates the actuating element 12 a second time. Now, the actuating element 12 rotates again in the feedback phase 62. If pairing with an external device has failed, or if access is denied after pairing with the external device, a second haptic feedback pattern is generated in the actuating element 12 when the actuating element 12 is rotated in the feedback phase 62. However, if the authorization process has resulted in granted access and the actuator 54 has been switched to the unlocked state, further rotation of the actuating element 12 will cause the mechanical lock 26 to open. In this case, no further haptic feedback pattern needs to be generated in the actuating element 12 under the control of the control system 16. Instead, "natural" haptic feedback will be generated in the actuating element 12 when the lock member is coupled to, and moved by, the actuating element 12. Although this specific example describes that the user stops rotation of the actuating element 12 in the feedback phase 62, the actuating element 12 may alternatively be rotated continuously during the feedback phase 62.

Figure 4:
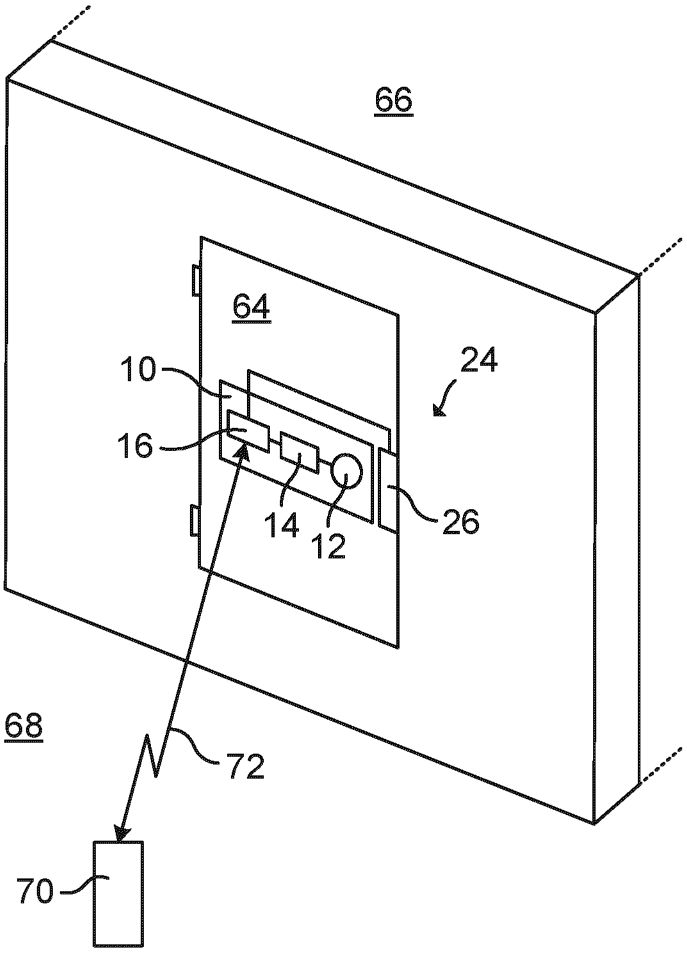
FIG. 4: schematically represents an environment in which the arrangement can be applied.

FIG. 4 schematically represents an environment in which the arrangement 10, and the electronic locking system 24 comprising the arrangement 10, can be applied. The arrangement 10 and the mechanical lock 26 are installed in a movable access member 64. The access member 64 can be a door, gate, hatch, cabinet door, drawer, window, etc. The actuating element 12 can be manually rotated relative to the access member 64. The stator 20 is fixed with respect to the access member 64.

Access to a physical space 66 is restricted by the access member 64 which is selectively unlockable. The access member 64 is positioned between the restricted physical space 66 and an accessible physical space 68. Note that the accessible physical space 68 can be a restricted physical space in itself, but in relation to the access member 64, the accessible physical space 68 is accessible.

The reading electronics 30 of the control system 16 communicates with an external device 70 over a wireless interface 72. The external device 70 can be any suitable device portable by a user and which can be used for authentication over the wireless interface 72. The external device 70 is typically carried or worn by the user and may be implemented as a mobile phone, smartphone, key fob, wearable device, smart phone case, RFID (Radio Frequency Identification) card, etc. Using wireless communication, the authenticity and authority of the external device 70 can be checked in an access control procedure, e.g. using a challenge and response scheme, after which the control system 16 grants or denies access.

When the access control procedure results in granted access, the credential evaluation electronics 32 of the control system 16 sends an unlock signal to the actuator 54 of the mechanical lock 26, whereby the actuator 54 adopts the unlocked state. In the unlocked state of the actuator 54, a lock member of the mechanical lock 26 can be moved by rotating the actuating element 12 and the access member 64 can thereafter be opened.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An arrangement for an electronic locking system, the arrangement comprising:

an actuating element arranged to perform an actuating procedure by means of manual manipulation by a user;

an electromagnetic generator comprising a stator and a rotor, the rotor being arranged to be rotationally driven relative to the stator at least temporarily during the actuating procedure by movement of the actuating element to thereby generate electric energy; and an electronic control system arranged to be electrically powered by the generator;

wherein the control system is arranged to control a load of the generator to change in order to provide haptic feedback in the actuating element at least temporarily during the actuating procedure.

2. The arrangement according to claim 1, wherein the actuating procedure comprises an energy harvesting movement, and a feedback phase initiated after initiation of the energy harvesting movement, wherein electric energy is generated by the generator when the actuating element is manipulated to perform the energy harvesting movement, and wherein haptic feedback is provided in the actuating element when the actuating element moves in the feedback phase.

3. The arrangement according to claim 1, wherein the control system is arranged to control the load of the generator to change in pulses in order to provide a pulsed mechanical response in the actuating element.

4. The arrangement according to claim 1, wherein the control system is arranged to control the load of the generator to change by changing an electric load of the generator.

5. The arrangement according to claim 1, wherein the control system is arranged to provide the feedback to the user when an amount of electric energy generated by the generator exceeds an energy threshold.

6. The arrangement according to claim 1, wherein the control system is arranged to provide the feedback to the user upon denied access of the electronic locking system.

7. The arrangement according to claim 1, wherein the control system is arranged to provide the feedback to the user upon a communication failure between the control system and an external device.

8. The arrangement according to claim 1, wherein the actuating procedure comprises a rotation of the actuating element.

9. The arrangement according to claim 1, wherein the actuating element comprises a knob.

10. The arrangement according to claim 1, wherein the control system comprises an electric energy storage device arranged to be electrically powered by the generator.

11. An electronic locking system comprising an arrangement according to claim 1.

12. The electronic locking system according to claim 11, further comprising an actuator for controlling at least one of a locking function or an unlocking function, wherein the actuator is arranged to be electrically powered by the generator.

13. The electronic locking system according to claim 12, wherein the control system is configured to produce an authorization signal, for switching the actuator from a locked state to an unlocked state, upon authorization of a user.

* * * * *